United States Patent [19]
Aycock et al.

[11] Patent Number: 5,765,138
[45] Date of Patent: Jun. 9, 1998

[54] APPARATUS AND METHOD FOR PROVIDING INTERACTIVE EVALUATION OF POTENTIAL VENDORS

[75] Inventors: Donald G. Aycock, Centerville; Jesse L. Farthing, Clifton, both of Va.

[73] Assignee: Bell Atlantic Network Services, Inc., Arlington, Va.

[21] Appl. No.: 518,512

[22] Filed: Aug. 23, 1995

[51] Int. Cl.$^6$ .................................................. G06F 153/00
[52] U.S. Cl. .................................................. 705/7
[58] Field of Search .......................... 395/201, 207, 395/337, 336, 338, 347, 353, 609, 610; 434/353, 354; 705/157

[56] References Cited

U.S. PATENT DOCUMENTS

| | | | |
|---|---|---|---|
| 5,287,448 | 2/1994 | Nicol et al. | 395/337 |
| 5,627,973 | 5/1997 | Armstrong et al. | 395/210 |

OTHER PUBLICATIONS

Krekjci, "Capable CMMS: A buyer's guide", Manufacturing Engineering v110n4 pp. 77–80, Apr. 1993, Dialog file 15, Accesion No. 00700869.

"Maple Systems International Announces Software Evaluatioin Tool", Sep. 4, 1986, Dialog file 621, Accession No. 00132975.

Bell Communications Research QPS 88.001, Issue 2, "Quality Program Specification for Surveillance Management Process (SMP)—Software" Dec. 19, 1994.

*Primary Examiner*—Gail O. Hayes
*Assistant Examiner*—Frantzy Poinvil
*Attorney, Agent, or Firm*—McDermott, Will & Emery

[57] ABSTRACT

An arrangement (apparatus and method) for providing an interactive evaluation of suppliers as proposed vendors for a project. A supplier evaluation system comprises a database storing a plurality of maturity requirements and recognized quality standards, and a main processing system for compiling selected standards and quality maturity requirements in accordance with project objectives. The project requirements are supplied by a communication network to a supplier in the form of an interactive supplier self-evaluation system. Alternatively, the supplier self-evaluation system may be provided to a supplier on a CD-ROM. The supplier self-evaluation system is arranged to include a plurality of objective questions corresponding to the selected maturity requirements. A supplier may selectively access local database files on the CD-ROM for information regarding the selected maturity requirements, or may remotely access the supplier evaluation system databases for supplemental information. After uploading the supplier responses to the supplier evaluation system, a supplier maturity level is calculated. An on-site supplier audit is thereafter conducted to confirm supplier responses and to obtain any additional information. Supplier approval is dependent upon a minimum supplier maturity level based upon the scored supplier responses to the maturity questions and the on-site audit.

38 Claims, 6 Drawing Sheets

APPARATUS AND METHOD FOR PROVIDING INTERACTIVE EVALUATION OF POTENTIAL VENDORS

FIELD OF THE INVENTION

The present invention relates to systems and methods used to analyze supplier capabilities in order to qualify a supplier as a vendor for a project.

DESCRIPTION OF THE RELATED ART

Vendor qualification is a process by which a group of suppliers of high technology goods and services are evaluated by a purchasing agent to determine at least one supplier that will qualify as a vendor capable of providing a satisfactory product and/or level of service based upon predetermined project objectives. A typical project scenario may involve a government agency, utility company, telephone company, automotive manufacturer, or high-technology system integrator that desires to purchase a computer-based system, such as a new payroll accounting system, or a private branch exchange (PBX) telephone network. Alternatively, the project scenario may involve a manufacturer identifying a reliable long-term supplier of quality goods: the automotive industry relies on suppliers to provide millions of substantially defect-free parts every year according to exacting schedules to minimize parts inventory. Alternatively, the project scenario may involve a telecommunications company purchasing central office switches, voice mail systems, computer systems, video dial tone network elements, components for local loop distribution, etc.

An important consideration in vendor qualification is quality (a product and/or service free from defects) and reliability (a product and/or service having a relatively long mean time between failures). The efforts to minimize defects may in some instances be more important than the technical specifications of the product or service. For example, defects that arise in products used in the telecommunications industry may cause disastrous consequences when implemented as a critical component in an established telecommunications network. Thus, purchasing agents will expend substantial efforts identifying suppliers able to provide a products that meet the necessary reliability standards of the relevant industry.

Vendor qualification typically involves the process of a purchasing agent identifying a set of technical requirements that need to be met, compiling the technical requirements into a request for proposal or a request for quotation (RFP/RFQ) that is disseminated to various suppliers, receiving and evaluating the RFP/RFQ responses from the suppliers, and selecting a vendor based upon the RFP/RFQ responses. The purchasing agent may be an employee, or "buyer", of the entity interested in purchasing the products or services identified in the RFP/RFQ, a contracting department of the buying entity, or an independent agent acting on behalf of the buying entity.

In responding to the RFP/RFQ, a supplier must provide both technical assurances that the technical specifications of a product will be met and quality assurances that quality control procedures are implemented. By selecting a supplier that has an established quality control procedure, there is a greater likelihood that the requested service and/or product will be supplied more reliably in terms of product performance and volume production, thereby resulting in less risk on the part of the buying entity from the standpoint of production control, project scheduling, and product reliability.

Quality assurance has evolved to the level whereby the International Organization for Standardization has established their own quality standards. For example, the International Organization for Standardization has issued a series of requirements such as ISO-9000 related to quality assurance. Such quality standards are an important consideration in both hardware and software products. With respect to software product development, quality standards are directed to a process evaluation of the method of designing and producing the software consistent with process control standards to increase the likelihood of a higher quality software product.

A problem with conventional vendor qualification techniques is that suppliers have difficulty responding to RFP/RFQ's that include the standardized quality control requirements. The standardized quality control requirements tend to be relatively complex. Further, there are different standardized quality control requirements for hardware products and software products. For example, an RFP/RFQ for a system including hardware and software may include various quality requirements from a plurality of standards organizations each having different objectives. Thus, a supplier may be unable to fully respond to an RFP/RFQ due to the complexity involved in the different quality requirements.

In addition, the evaluation of a supplier's response to the RFP/RFQ may be difficult from a comparison standpoint, especially since the evaluation is based upon a subjective evaluation of the supplier's response. Thus, it may be difficult for a reviewer of the supplier's responses to gain a full understanding of the supplier's responses compared with other suppliers, especially when many individuals having different subjective criteria are used in the evaluation process. Hence, experts are often needed to review the supplier responses, thereby complicating the evaluation process.

DISCLOSURE OF THE INVENTION

In view of the foregoing, there is a need to provide a system that enables a more objective analysis for evaluating supplier capabilities to qualify a supplier as a vendor for a project.

There is also a need for a system that provides a more efficient generation of requests for proposals (RFP/RFQs), whereby a system designer may select different standards depending upon their relevance.

There is also a need for an interactive supplier response system, enabling a supplier to more efficiently and more accurately respond to the request for proposal. Moreover, it is desirable that such a system enables a supplier to selectively access specifications stored locally or from a remote source, such as a centralized database.

There is also a need for a supplier evaluation system that provides objective criteria for selecting a vendor, as opposed to subjective evaluation of supplier responses to an RFP/RFQ.

These and other needs are met by the present invention. The present invention provides a method and apparatus for evaluating supplier capabilities to qualify a supplier as a vendor for a project. The method and apparatus for evaluating supplier capabilities may be used by a purchasing agent of an entity (public or private) interested in purchasing products or software services. According to the present invention, vendor requirements are selected for a vendor qualification, and the vendor requirements are assigned a relative weight on the basis of project objectives. The requirements are provided to a supplier, for example in the form of software which may be downloaded from the evaluator's business system to the supplier's sales department. After receiving supplier responses to the requirements, the supplier responses are assigned a scaled score on the basis of corresponding desired vendor responses. The scaled score of the supplier responses are correlated with the relative weight of the requirements, and a supplier maturity level is calculated representing an objective evaluation of the supplier responses. The supplier maturity level refers to the supplier's sophistication and capabilities in establishing and maintaining quality standards in the design, production, distribution, serviceability, and reliability of the supplier's product or service. Additional iterations of vendor requirements and supplier responses may be provided to obtain more detailed evaluations of a supplier. After the supplier maturity level has been calculated, a supplier site evaluation is conducted based on the supplier maturity level and the vendor requirements in order to generate an on-site evaluation report. The on-site evaluation report is compared with the supplier maturity level to provide a combined supplier evaluation between the supplier responses and the supplier site evaluation. The supplier is then selected as a vendor in accordance with the combined supplied evaluation.

According to the present invention, a selected group of requirements defining quality control standards, also referred to as maturity requirements, are applied on the basis of project objectives. The selected requirements are supplied in a RFP/RFQ as objective criteria to be met by a desired vendor in a project. Upon receiving the supplier responses, each response is provided with a scaled score. By correlating the scaled score with the relative weight of each of the requirements with respect to the project objectives, the present invention enables an objective evaluation of the supplier responses in order to determine a supplier maturity level.

Moreover, the on-site evaluation at the supplier site enables validation of the supplier responses, and enables further objective evaluations of supplier capabilities to meet project requirements. Thus, the present invention provides an improved arrangement for evaluating suppliers as qualified vendors by establishing more objective criteria, thereby eliminating the need for subjective evaluation by experts.

The present invention also provides a system for the evaluation of suppliers for a project. The system comprises a first database storing a plurality of existing standards for use in formulating a set of requirements for a project, a vendor database storing existing vendor performance reports, historical vendor performance reports and prior on-site audit reports, a product database identifying product performance and reliability for existing products supplied by existing and prior vendors, and a main processing system for selectively accessing the databases in response to database access requests, and for compiling supplier compliance levels based upon input supplier responses and weighting factors. The system also comprises a business system portion for accessing the main processing system in order to design the RFP/RFQ, respond to supplier queries regarding issued RFP/RFQ's, supply on-site inspection (audit) reports to the vendor database, and supply any parameters necessary for making a final determination for selecting a vendor from different suppliers.

The system may also include a supplier interface enabling a supplier to send and receive information to the supplier evaluation system. The supplier interface enables a supplier to electronically download the RFP/RFQ, which may be in the form of an executable code or a protected data file. The supplier interface may also enable the supplier to electronically upload the supplier responses to the supplier evaluation system. In addition, the supplier interface may allow a supplier to selectively access the databases of the supplier evaluation system in order to receive information on existing vendor performance reports or product updates, as well as download specifications relevant to the particular RFP/RFQ.

The present invention also provides a supplier self-evaluation system that enables a supplier to more efficiently respond to a request for proposal. According to the present invention, a supplier self-evaluation system enables a supplier to perform a self-evaluation and verification with respect to project requirements, and enables a supplier to generate a supplier response. In addition, the supplier self-evaluation system provides interactive access of product or systems specifications from a locally-stored or remote database. Finally, the supplier self-evaluation system enables the supplier to electronically transmit the supplier response file to the evaluator, thereby resulting in a more efficient response process for the supplier.

According to the present invention, the supplier self-evaluation system comprises a RFP/RFQ template file comprising the project requirements determined by the buyer, a plurality of specification files that include selected portions of standard specifications referenced in the RFP/RFQ, a communication module enabling access to a remote database having complete files of the standards identified in the RFP/RFQ, and a word processing based computer system having an access routine to selectively access the specification files and the remote database in response to user requests. The access routine selectively accesses the local specification files and the communication software to provide information to a user operating the word processing system based on user requests for information. In response to user inputs, the word processing based system generates a vendor response file including the supplier responses to the requirements identified in the RFP/RFQ template file. Thus, the supplier self-evaluation system enables interactive access to data files necessary for completion of the supplier responses to the RFP/RFQ requirements in an efficient manner.

These and other features of the present invention will become readily apparent in view of the accompanying drawings and the detailed description of the embodiments.

BEST MODE FOR CARRYING OUT THE INVENTION

Figure 1:
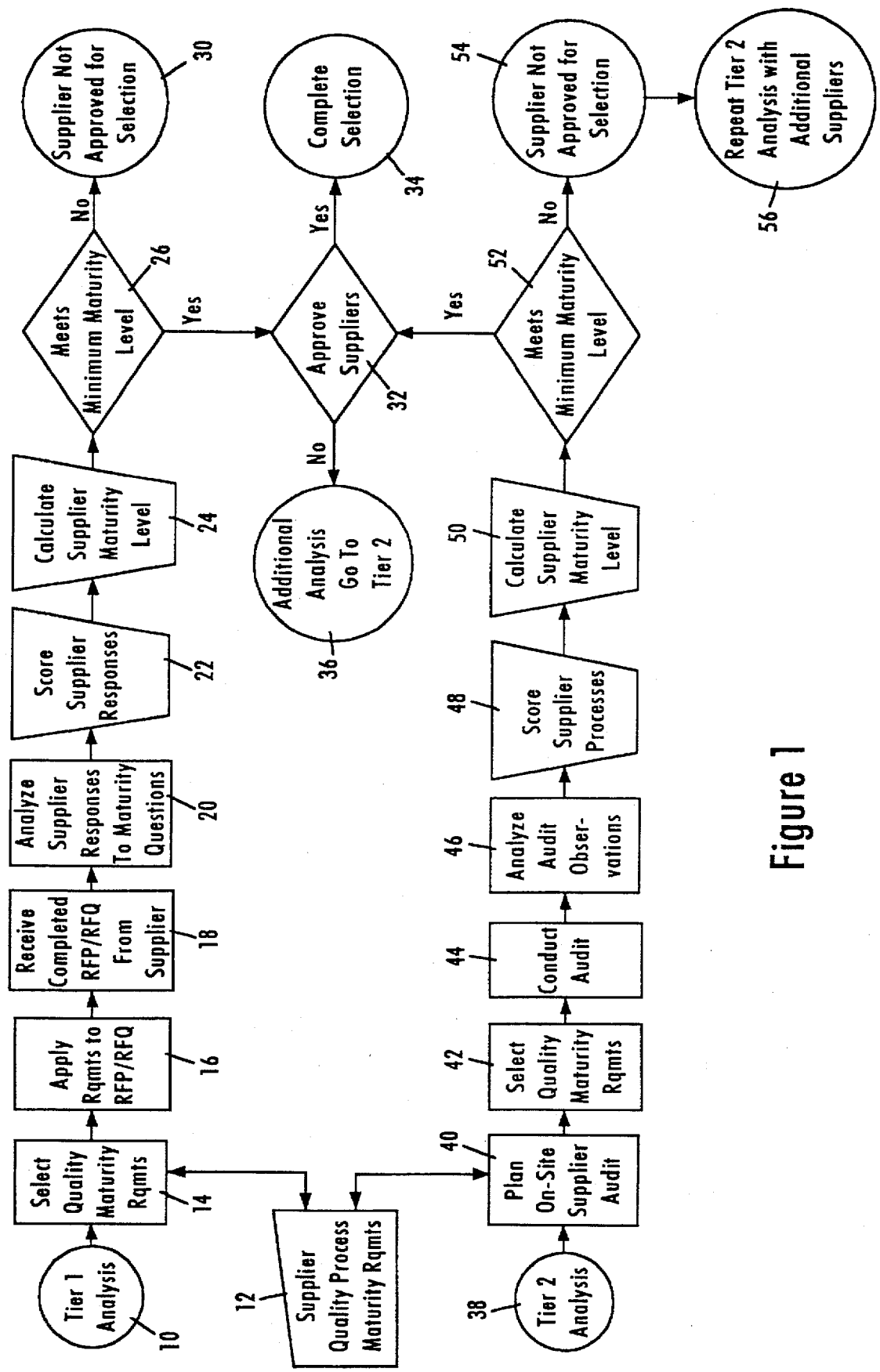
FIG. 1 is a flow chart of the supplier quality maturity assessment process according to the present invention.

FIG. 1 is a flow diagram of a method for evaluating supplier capabilities to qualify a supplier as a vendor, according to a preferred embodiment of the present invention. Specifically, the disclosed method is directed to evaluating the quality control capabilities of the supplier and is therefore also referred to as a supplier quality maturity assessment process. The supplier quality maturity assessment process (SQ-MAP) is a supplier selection analysis to measure a supplier's quality process maturity. The SQ-MAP process is based upon national and international quality standards including ISO 9001/ISO 9000-3, the disclosures of which are incorporated herein by reference. The SQ-MAP process is applicable for assessing the quality process maturity level of hardware manufacturing and software development suppliers. In addition, the SQ-MAP process is designed for use during the selection and acquisition phases of the product procurement cycle.

The process in FIG. 1 begins with a tier 1 analysis which is directed to the generation of a request for proposal or a request for quotation (RFP/RFQ), providing the RFP/RFQ to a supplier, receiving the supplier responses, and calculating a supplier compliance level, also referred to as a supplier maturity level.

Specifically, the tier 1 analysis in step 10 begins with establishing a master set of supplier quality process maturity requirements in step 12. These maturity requirements may be established from a known set of quality process standards, such as: ISO 9001 "Quality Systems—Model for Quality Assurance and Design, Production, Installation and Servicing"; ISO 9000-1 "Quality Management and Quality Assurance Standards: Part III-Guidelines for the Application of ISO 9001 to the Development, Supply and Maintenance of Software"; IEEE Std. 1074 "Standard for Developing Life Cycle Processes"; DOD-STD-2167A, "Defense System Software Development"; DOD-STD-2168, "Defense System Software Quality Program"; Bellcore documents TR-NWT-0001252, "Quality System Generic Requirements for Hardware", Issue 1, December 1992 and TR-NWT-000179, "Quality System Generic Requirements for Software", Issue 2, June 1993, the disclosures all of which are incorporated herein by reference.

The set of supplier quality process maturity requirements established in step 12 serve as a reference for all available maturity requirements for use in establishing quality maturity requirements for a specific project. As discussed below in detail with respect to FIG. 2, these supplier quality process maturity requirements may be set up in a database for selective access.

The tier 1 analysis continues to step 14 in FIG. 1, whereby quality maturity requirements are selected from the set of requirements established in step 12 in accordance with project requirements. For example, a project related to a voice mail system may have a set of hardware requirements and software requirements. However, if the project requirements specify that the hardware for the voice mail system will not be within a central office, then certain hardware safety standards specifically related to central office equipment would be unnecessary. As an alternative example, a design project involving software systems only do not require additional quality standards related to hardware-based systems. For example, a software-only design project would use the above-identified Bellcore standard TR-NWT-000179, whereas a hardware-only design would use the above-identified Bellcore standard TR-NWT-0001252, and a design comprising hardware and software components would use at least portions from both standards. Hence, the system in step 14 selects only those quality maturity requirements from the set of maturity requirements established in step 12 that are necessary for the objectives of the specific project.

After the necessary quality maturity requirements have been selected in step 14, the process continues at step 16 to apply the requirements to the request for proposal/request for quotation (RFP/RFQ), which includes requirements for technical specifications, price and availability, service and support and the selected quality maturity requirements from step 14. The completed RFP/RFQ in step 16 is disseminated to suppliers that desire to be qualified as vendors for the identified project. The completed RFP/RFQ is received from the supplier in step 18, and includes the supplier responses to the RFP/RFQ requirements in step 16. As discussed in detail below with respect to FIG. 4, the supplier responses may be in written form, or may be electronically stored on a tangible medium, such as a floppy diskette, a non-volatile memory card, or other type of device.

After the completed RFP/RFQ including the supplier responses is received from the supplier in step 18, the supplier responses to the maturity questions are analyzed in step 20. As discussed above with respect to step 14, certain maturity requirements have different levels of relevance to the project objectives. Thus, each of the maturity questions are assigned a weight value corresponding to the relevance of the maturity questions to the project objective. Thus, a maturity question may be assigned a weight factor of 1–5, whereby a maturity question having a weighted value of 1 would refer to a maturity requirement having a modest degree of relevance to the project objective, whereas the weighting value of 5 refers to a maturity requirement having a critical relevance to the project objective. For example, a maturity question such as "Has a quality system been established, documented and maintained which covers all phases of the software life cycle" may have a weighting value of 1 for a product having primarily hardware-specific functionality, whereby the software is incidental to the overall functionality of the product. However, if the same maturity question is directed to a product that is essentially a software-based computer system, the same question may have a weighting value of 5 for the software-based product.

A weighting value may also be assigned on the basis of the relative sophistication of the maturity requirement. For example, the requirements may be organized on the basis of maturity level, whereby level 2 maturity level represents a supplier that exhibits an elementary level of quality maturity by demonstrating a repeatable process; level 3 refers to a defined level of maturity that demonstrates a standardized process; level 4 refers to a managed level of maturity that demonstrates a quantitatively controlled process; level 5 refers to an optimized level of maturity that demonstrates a continuously improved process; and level 6 refers to a world class level of maturity that demonstrates a process that is typically used only by a quality leader. If a supplier favorably responds to a question representative of a level 2 maturity level, the response would be given a weighting factor of 1; in contrast, if a supplier favorably responds to a question representative of a level 6 maturity question, the response would be given a weighting factor of 5.

According to the preferred embodiment, the maturity questions applied to the RFP/RFQ in step 16 are written in an objective format, such as "yes"or "no" type questions, or asking the supplier to select a response "A–E" that best represents the suppliers capabilities. The supplier responses are then scored based upon an objective evaluation of the responses. For example, for "yes"or "no" type of responses, a supplier response may receive a predetermined point value. Thus, if a supplier answers "no", or does not provide a response, the supplier would receive a score of "0" for that particular maturity question. If, however, the supplier responds with a "yes", then the supplier would be awarded a score of "1" for the score for that question. Alternatively, for a multiple-choice question having multiple choices "A–E", the responses may have respective point values "1–5". As another example, if the supplier provides a written response to a maturity question, the supplier response may be scored on the basis of a response schedule, whereby a point is awarded for each item identified by the response. In other words, a response schedule may identify 10 possible items that may be identified in the supplier's response. In this case, the supplier receives a predetermined point value for each item identified in the supplier's response. The items in the schedule may have identical point values, or may have different point values, depending upon the relevance and importance of the item to the maturity question.

After scoring the supplier responses in step 22, a supplier maturity level is calculated in step 24. The supplier maturity level may be calculated in a variety of ways. For example, the supplier maturity level may be calculated by correlating the score of each supplier response with the weighting value of the corresponding maturity question. In such a case, a supplier maturity level value is calculated as a weighted summation of the supplier responses. In addition, the supplier maturity level may be calculated on the basis of the mean value of the supplier responses and/or the standard deviation of the suppler responses. For example, assuming each of the supplier responses had a possible score in the range of 1–5, if all the maturity questions have relatively all the same weight value, then the mean score may be used to determine the average supplier maturity level for the different requirement. In addition, if consistency in providing the same level of maturity for different requirements is an important consideration, then the calculated maturity level may be dependent upon the standard deviation of the supplier responses scored. Thus, it may be more desirable to select a supplier having an overall lower mean score, but which has a more consistent evaluation, as opposed to a supplier that has a higher mean score but which has inconsistent or substantial variations in the different responses.

Upon calculating the supplier maturity level in step 24, it is then determined in step 26 whether the supplier meets the minimum maturity level. Preferably, the minimum maturity level is set at either a level 2 maturity level for a repeatable process, or a level 3 maturity level for a standardized process. If the supplier does not meet the minimum maturity level in step 26, the supplier is automatically rejected in step 30.

However, if it is determined in step 26 that the supplier meets the minimum maturity level, then an interim decision is made in step 32 whether to automatically approve the supplier. For example, if the supplier is a regular and established vendor for other projects, and has an excellent historical vendor performance to suggest that the supplier responses are accurate and that the supplier would be a high-quality reliable vendor, then the supplier may be automatically approved as a vendor in step 34. If there are only one or two suppliers that are to be qualified as vendors, the process may end here. More typically, however, the supplier evaluation may be part of an overall competitive bidding scenario. In this case, additional suppliers may be compared and analyzed to obtain at least one qualified vendor. Thus, if it is determined in step 32 that an automatic approval of a supplier cannot be made, then an additional tier 2 analysis is performed, namely performance of an on-site supplier audit to validate the supplier responses, and to gain any additional information necessary to complete the supplier selection process.

Step 38 identifies the beginning of the tier 2 analysis for an on-site supplier audit. The relevant supplier quality process maturity requirements are selected in step 40 from the set of maturity requirements established in step 12. For example, there may be specific maturity requirements that are relevant to production control and design control to be used as criteria during the on-site supplier audit. In addition, requirements may be selected to supplement the maturity questions generated for the RFP/RFQ in steps 14, 16 and 18. Thus, the more detailed maturity requirements selected in step 42 concerns the function of validating the supplier responses, and identifying the detailed quality control procedures used by the supplier. This technique may be particularly effective when a novice supplier may not have a full understanding of the maturity questions in the RFP/RFQ, and may lack the sophistication typically needed to respond to RFP/RFQ's generally. Thus, the selected quality maturity requirements in step 42 enable validation of the supplier responses, and provide a framework for a more detailed evaluation of the supplier capabilities and maturity level.

After the quality maturity requirements have been selected in step 42, a physical audit at the supplier site is conducted in step 44. The on-site audit, also referred to as a supplier site evaluation, is typically performed by the purchasing agent and/or employees/consultants of the buying entity specialized in relevant fields, such as design engineers, quality control engineers, production engineers, and production control managers responsible for production scheduling. The on-site audit includes validating the supplier responses to the RFP/RFQ, either by performing actual tests on hardware equipment or software systems, and/or by reviewing the quality control procedures and processes at the supplier site. The results of the audit are recorded in an on-site audit report, also referred to as the on-site evaluation report, in step 46. Upon completing the on-site audit report after analyzing the audit observations in step 46, the supplier processes are scored on the basis of the on-site audit report and the selected quality maturity requirements from step 42. The scoring technique in step 48 uses similar processes as discussed above with respect to step 22.

After the supplier processes have been scored in step 48, the supplier maturity level is recalculated in step 50 to account for variations between the supplier responses to the RFP/RFQ and the audit observations, and in view of the additional information obtained from the audit, separate from the responses to the maturity questions in the tier 1 analysis.

After recalculating the supplier maturity level in step 50, it is determined in step 52 whether the supplier meets the minimum maturity level. If it is determined that the supplier does not meet the minimum maturity Level in step 52, then the supplier is not approved for selection (step 54), and the tier 2 analysis is repeated for additional suppliers (step 56).

If, however, it is determined in step 52 that the supplier meets the minimum maturity level in step 52, then the processes turns to step 32 to determine whether the supplier should be approved as a qualified vendor. At step 32, as discussed above, different considerations may come into play, especially for competitive bidding scenarios. For example, step 32 may include a risk assessment that compares the technical capabilities of the supplier and project price offered by the supplier with the relative risk as to success of the project as determined by the supplier's maturity level calculated by the buyer. For example, in some instances it may be desirable from a risk assessment standpoint to select a supplier that has a higher maturity level, despite an increased cost, in order to maximize reliability. In some instances, however, it may desirable to select a lower cost supplier that maintains a satisfactory supplier maturity level in order to take advantage of a reduced cost within an acceptable risk.

Figure 2:
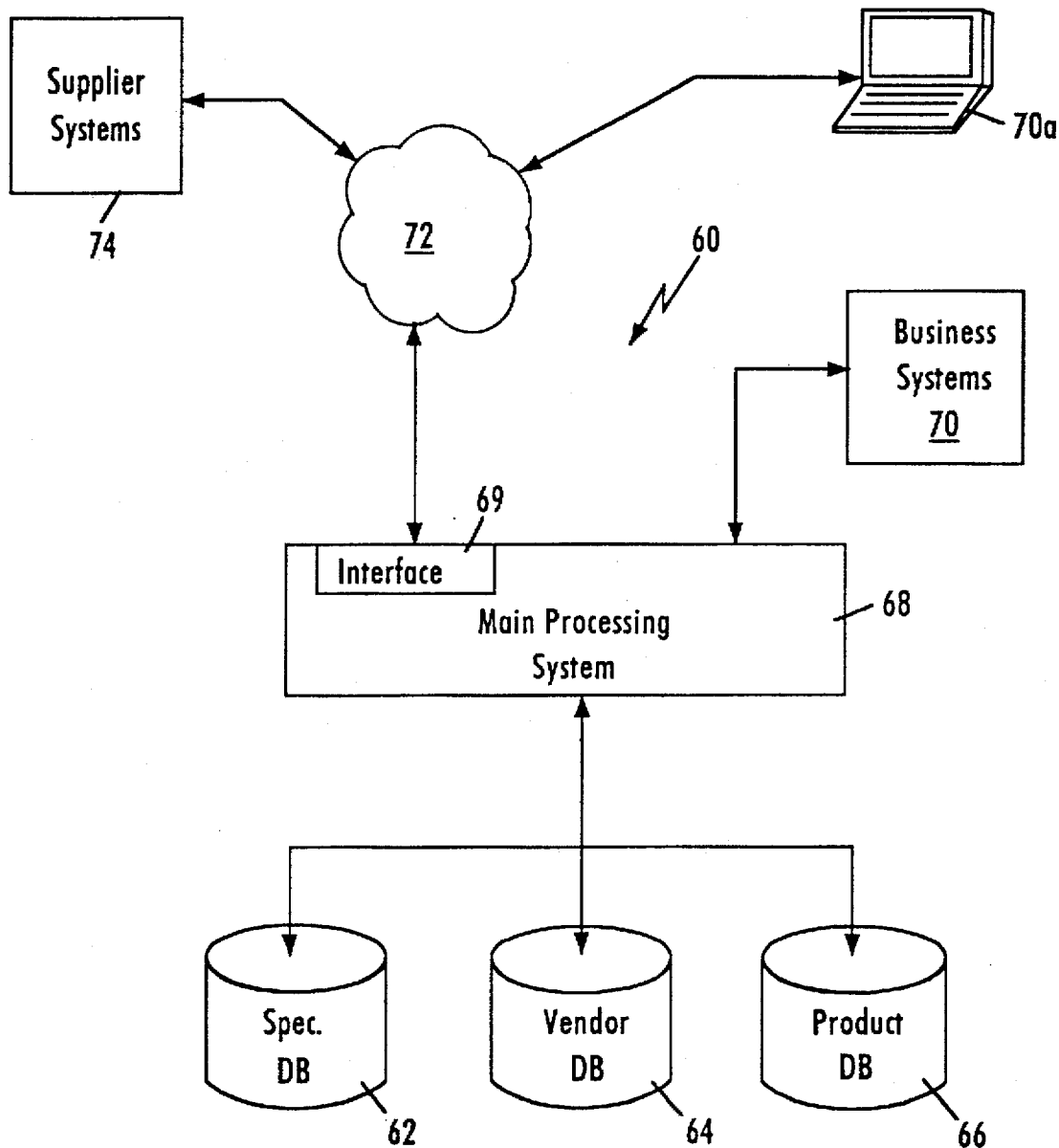
FIG. 2 is a block diagram of a supplier evaluation system for executing the method of FIG. 1.

FIG. 2 is a block diagram of a supplier evaluation system 60 according to an embodiment of the present invention. The supplier evaluation system 60 is designed to allow the entity generating the RFP/RFQ to generate the RFP/RFQ in an efficient manner by using interactive software enabling access to a database storing a plurality of supplier quality process maturity requirements. In addition, the supplier evaluation system 60 enables downloading of a RFP/RFQ to a supplier using an external communication network, thereby reducing or eliminating the necessity of voluminous paper transactions. The supplier evaluation system 60 is also designed to enable a supplier to have limited access to the evaluation system databases to obtain more detailed information, for example, about the RFP/RFQ itself or standards referenced in the RFP/RFQ. Finally, the supplier evaluation system 60 is designed to enable the supplier to upload the RFP/RFQ responses directly to the supplier evaluation system for automatic processing of the supplier responses.

As shown in FIG. 2, the supplier evaluation system 60 comprises a specification database 62 storing the master set of supplier quality maturity requirements established in step 12 in FIG. 1 above. Thus, the specification database 62 serves as a library for all hardware and software specifications for known quality process standards. As discussed above with respect to step 12 in FIG. 1, such standards may be established by organizations such as International Organization for Standardization (ISO), Institute of Electrical and Electronic Engineers (IEEE), Department of Defense (DOD), Underwriters Laboratory (UL), ANSI, AT&T, Bellcore, etc. In addition, the specification database 62 may store standards established by private companies or recognized vendors that may be necessary for systems compatibility between components from different vendors.

The supplier evaluation system 60 also comprises a vendor database 64 that stores existing vendor performance reports, historical vendor performance reports, any prior on-site audit reports, and supplier responses to issued RFP/RFQ's. The existing vendor performance reports include performance evaluations for existing vendors and action registers that identify problems to be resolved by the corresponding vendor. Similarly, the historical vendor performance reports typically include performance reports for past vendors, or performance reports of existing vendors on past projects. The vendor database 64 also stores on-site audit reports from prior supplier visits, including on-site audits corresponding to step 44 of FIG. 1, as well as any additional reports of on-site supplier inspections. Finally, the vendor database 64 stores all supplier responses to issued RFP/RFQ's including, for example, electronic data files uploaded from a supplier site. Thus, the vendor database 64 includes all information related to evaluations of suppliers and approved vendors. As discussed above with respect to step 32 of FIG. 1, the information from the vendor database 64 may be used to determine the final selection of a supplier as an authorized vendor.

The supplier evaluation system also comprises a product database 66 that identifies product performance and reliability for existing products supplied by existing and prior vendors. For example, in the field of telecommunications, the product database may include a data record for a digital switch manufactured by an approved vendor. Such a record would include a vendor identification, the model number of the digital switch, and an evaluation of the product conformance to technical specifications, and an evaluation of the product reliability. Thus, while the vendor database 64 evaluates performance and quality maturity from the perspective of the vendor generally, the product database 66 enables specific evaluation of products supplied by existing and prior vendors. Thus, the product database 66 enables a competitive analysis of all vendors that produce a selected switch to determine the respective performance of the vendors. Alternatively, the performance evaluation of all products from a selected vendor may be correlated in order to gain an overall assessment of the selected vendor based on all prior products supplied by that vendor. Further, the product database 66 may include additional fields related to the technical or fiscal parameters of the product. The product database 66 may store information related to various types of products, such as hardware products, software, central office equipment, customer premises equipment, or other specialized equipment.

The supplier evaluation system 60 of FIG. 2 also includes a main processing system 68, and a business terminal system 70. The business terminal system 70 provides direct access to the main processing system 68. Alternatively, the business terminal system 70a may be remotely accessible to the main processing system 68 via, for example, a communication network 72. The business terminal system 70 provides a graphic user interface for a system designer designing the RFP/RFQ and a buyer evaluating suppliers. For example, a system designer may design the RFP/RFQ by determining at least part of the project objective by accessing the requirements for specific products from the product database 66. In response to an access request from the business terminal system 70, the main processing system 68 accesses the product database 66 in order to obtain the relevant performance requirements for the selected product under consideration. If the system designer is designing a RFP/RFQ for a system that uses existing products, the main processing system 68 may access the necessary specifications from the specification database 62 corresponding to the selected products from the product database 66 in order to compile a selected set of maturity requirements for the RFP/RFQ.

In addition, the system designer may use the business terminal system 70 to input the project objectives and the corresponding fields that identify the relevant specifications in the specification database 62. In a public telecommunications, for example, the system designer may identify as a project objective the construction of a new central office; in such a case, the main processing system 68 would access the specification database 62 to obtain all maturity requirements related to the construction of central office equipment, as opposed to maturity requirements for customer premises equipment or facilities. After accessing the required maturity requirements, the system designer will use the business terminal 70 to complete the generation of the RFP/RFQ, and thereafter send an instruction to the main processing system 68 to download the RFP/RFQ to a supplier site 74 via the communication network 72.

The main processing system 68 includes a supplier interface 69 enabling remote access via the communication network 72. Upon receiving a proper access code, the supplier interface 69 enables a supplier to electronically download the RFP/RFQ, which may be in the form of an executable code or a protected data file. The supplier interface 69 may also enable the supplier to electronically upload the supplier responses to the main processing system 68. In addition, the supplier interface may allow a supplier to selectively access the databases of the supplier evaluation system 60 in order to receive information on existing vendor performance reports or product updates, as well as download specifications relevant to the particular RFP/RFQ.

As discussed below in detail with respect to FIGS. 3–5, the supplier site 74 may use the downloaded RFP/RFQ system in an interactive manner to fully respond to the RFP/RFQ. Upon completing the RFP/RFQ, the supplier site 74 uploads the supplier response to the main processing system 68. Upon receiving the RFP/RFQ response from the supplier, the main processing system 68 stores the submitted RFP/RFQ response in the vendor database for later analysis by the user of the business terminal system 70.

The user evaluating the RFP/RFQ responses then accesses the stored RFP/RFQ response from the vendor database 64 in order to analyze the supplier responses to the maturity questions, and to score the supplier responses. For example, the user evaluating the RFP/RFQ responses inputs to the business terminal system 70 a command identifying the scoring technique to be used by the main processing system 68, after which the main processing system 68 returns a calculated supplier maturity level, as well as an indication as to whether the calculated supplier maturity level is greater than the minimum maturity level. At this point, the main processing system 68 can be designed to perform an auto-rejection of the supplier if the supplier does not meet the minimum maturity level. In addition, if the supplier is a recognized vendor from previous projects, the main processing system 68 may prompt the user of the business system 70 evaluating the RFP/RFQ responses whether the supplier should be automatically approved, as well as a prompt to access the vendor database for existing action registers, vendor historical performance or prior on-site audit reports for the vendor selected.

The user of the business system 70 evaluating the RFP/RFQ responses may also use the main processing system 68 to design the maturity requirements to be analyzed during the on-site audit. For example, after calculating the supplier maturity level, the user of the business system 70 may access the specification database 62 for more detailed information regarding the specifications relevant to the selected maturity requirements. In addition, the specification database 62 may be accessed by the main processing system 68 to cross reference the selected maturity requirements with other maturity requirements or selected maturity requirements required for the project. In addition, the user evaluating the RFP/RFQ responses may access the vendor database 64 in order to identify prior vendor performance, as well as any prior on-site audit report stored in the vendor database 64. The main processing system 68 will then compile the accessed specification records, action registers, historical performance reports and/or on-site audit reports to generate an audit schedule for use during the on-site audit at the supplier site.

During the physical audit at the supplier site, the user evaluating the RFP/RFQ responses may access the supplier evaluation system 60 using the business terminal system 70A, which may be implemented as, for example, a lap-top PC having a modem and a CD-ROM drive for reading a CD-ROM storing the RFP/RFQ and relevant specifications and maturity requirements, discussed in detail below. In such a case, the user may access the supplier evaluation system 60 via the communications network 72 in order to automatically upload to the supplier evaluation system 60 an audit report, or to download any additional information from the main processing system 68 or any of the databases.

Figure 3:
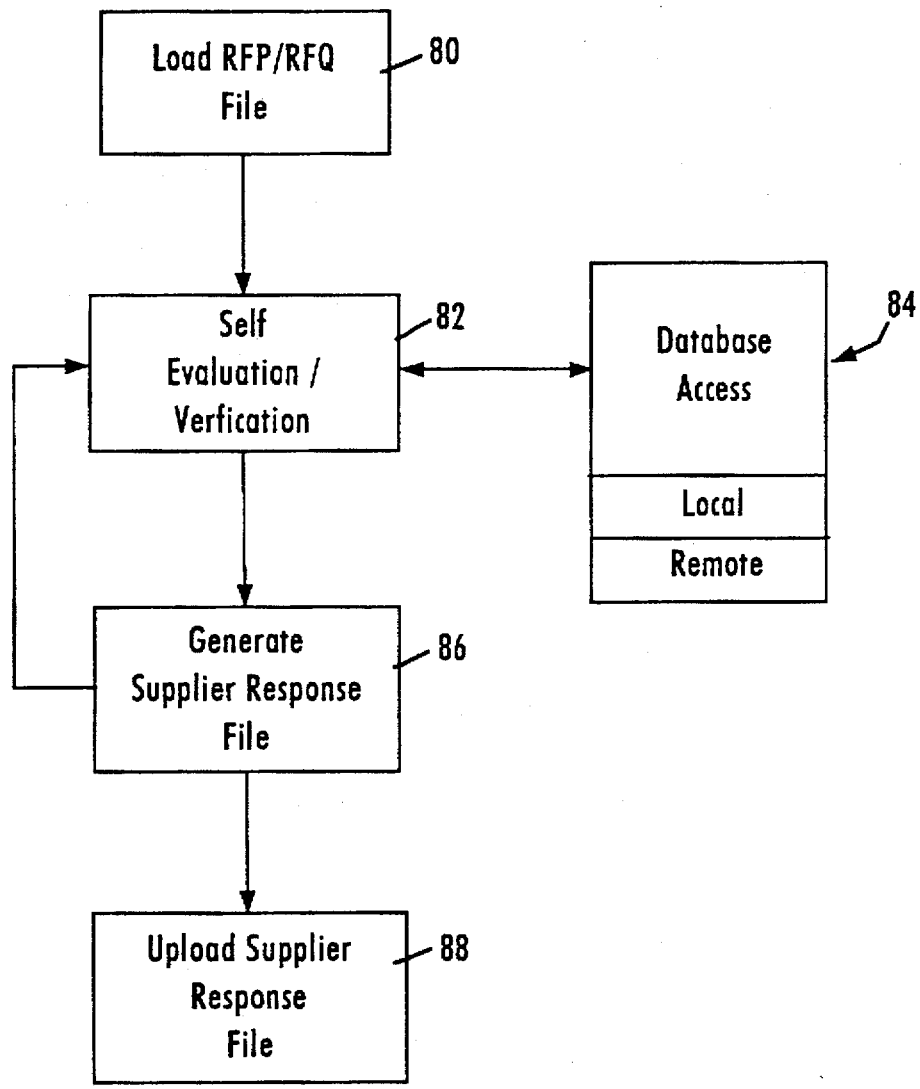
FIG. 3 is a flow diagram of a supplier self-evaluation system of the present invention.

FIG. 3 is a flow diagram of a supplier self-evaluation system according to the present invention. The supplier self-evaluation system is provided to the supplier as part of the RFP/RFQ, and may be implemented on a CD-ROM disc, or may be downloaded from the supplier evaluation system 60 via the communication network. The supplier self-evaluation system enables a supplier to perform an interactive self-evaluation in preparation for responding to an RFP/RFQ by generating a series of questions for the supplier in accordance with the project requirements and the quality maturity requirements selected in step 14 of FIG. 1, and by providing interactive access to product or system specifications stored in internal databases. In addition, the supplier self-evaluation system provides remote access to database systems storing complete specifications, such as the specification database 62 in FIG. 2. The supplier self-evaluation system also enables the supplier to electronically upload the supplier response file to the RFP/RFQ evaluator.

As shown in FIG. 3, the first step of the supplier self-evaluation system is to load the RFP/RFQ file into a computer processing system at the supplier site (step 80). As discussed in detail below with respect to FIG. 4, the RFP/RFQ file is preferably a template file on a tangible medium, such as a magnetic medium or CD-ROM. The RFP/RFQ file may be either a read-only document file comprising the list of questions in the RFP/RFQ for use by a word processing-based system or the RFP/RFQ file may be an interactive program that provides a step-by-step interview process for the supplier to respond to general or specific questions about the supplier's capabilities, during which point the supplier responses are appropriately compiled into the appropriate portions of the RFP/RFQ.

The RFP/RFQ file in step 80 may be loaded either by reading a file from a tangible medium such as a compact disc, or by downloading the RFP/RFQ from the main processing system 68 shown in FIG. 2 to the supplier site 74. Alternatively, the RFP/RFQ file may be loaded by the supplier at the supplier site 74 accessing the main processing system 68 to initiate an on-line evaluation session, whereby the on-line evaluation session is managed by the main processing system 68.

Referring to FIG. 3, after the RFP/RFQ file has been loaded in step 80, the supplier executes the RFP/RFQ file in step 82 to perform a self-evaluation/verification in accordance with the selected quality maturity requirements from step 14 of FIG. 1. As discussed above, the self-evaluation/verification procedure may be implemented by providing the RFP/RFQ questions in electronic format to enable the user to respond to the questions; in such a case, there will typically be a help function and a specification cross reference function to assist the supplier in responding to each of the questions. Alternatively, the supplier is presented with a series of interview-type questions directed to answering specific components of the RFP/RFQ questions in accordance with the selected quality maturity questions. As discussed in detail below with respect to FIG. 6, the supplier is presented with a screen that provides a question from the RFP/RFQ, a portion for the supplier to enter a response, and icons identifying a context-sensitive help function, maturity requirements and/or specifications corresponding to the displayed question.

As shown in FIG. 3, during the self-evaluation in step 82, the user is able to interactively access databases to obtain the maturity requirements and/or specification corresponding to the displayed question from the RFP/RFQ (step 84). The database access in step 84 accesses locally-stored databases that are included as part of the supplier-evaluation system, shown in detail below with respect to FIG. 4. In addition, the database access step 84 may involve accessing the remote databases 62, 64, and 66 in the supplier evaluation system 60 via the communication network 72. Thus, while the supplier self-evaluation system includes a local database for use in responding to the RFP/RFQ, the supplier self-evaluation system also provides means for accessing the remote databases in order to obtain more detailed information regarding the selected maturity requirements in the RFP/RFQ.

As the supplier provides responses to the questions during the self-evaluation/verification step 82, the supplier self-evaluation system generates a supplier response file in step 86. The supplier response file will be implemented, for example, as a word processing-based document. Upon completion of the supplier response file in step 86, the supplier response file is uploaded to the supplier evaluation system 60 shown in FIG. 2 (step 88).

Figure 4:
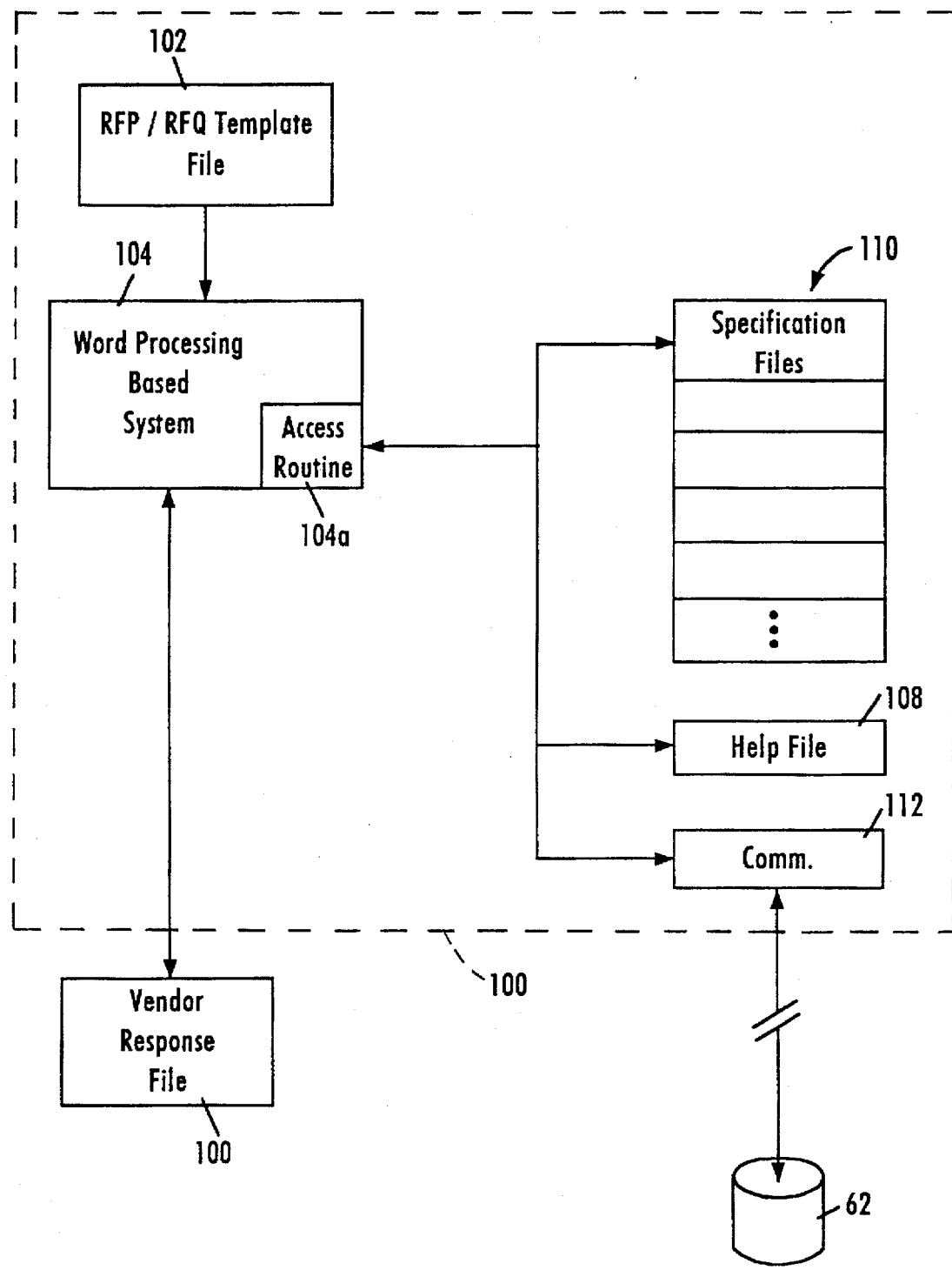
FIG. 4 is a block diagram of the supplier self-evaluation system of FIG. 3.

FIG. 4 discloses an exemplary structure of the supplier self-evaluation system. As shown in FIG. 4, the supplier self-evaluation system 100 comprises an RFP/RFQ template file 102 that is preferably implemented as a read-only data file. The RFP/RFQ template file 102 includes all maturity requirements and questions necessary for the supplier to respond to the RFP/RFQ generated in accordance with the above discussion with respect to FIGS. 1 and 2. The data from the RFP/RFQ template file 102 is supplied to a word-processing based system 104, which generates the graphic user interface shown in FIG. 6 to present the requirements and questions to the supplier, and which generates the vendor response file 106 storing the supplier responses to the questions presented.

The word-processing system 104 also comprises an access routine 104a used to access related specification files and help files in response to the supplier requests. For example, the access routine 104a enables the supplier to access a help file 108 providing context-sensitive information in responding to the question or operating the supplier self-evaluation system. If the supplier wishes to request information on a maturity requirement or standard, the access routine 104a fetches the corresponding maturity requirement file or specification file from a local specification database 110 that is stored locally on the CD-ROM or other tangible medium. The supplier self-evaluation system also comprises a communication software 112 to enable the access routine 104a to access limited portions of the remote specification database 62 at the supplier evaluation system 60. Thus, if a supplier desires detailed information that supplements the data stored in the local specification database 110, the access routine 104a uses the communication software 112 to access the specification database 62 for maturity requirements and/or standards that supplement the information stored in the local specification database 110.

Figure 5:
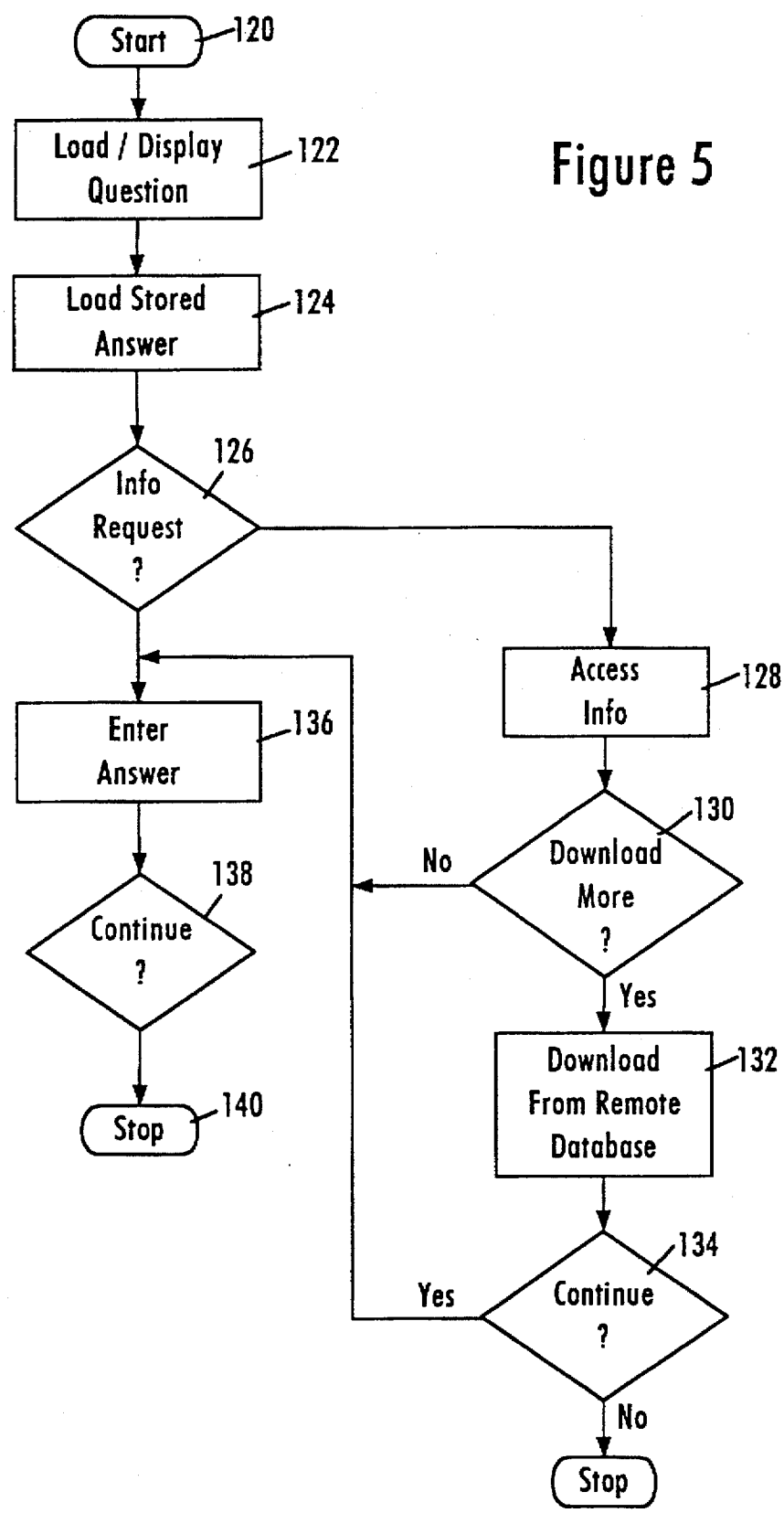
FIG. 5 is an exemplary flow diagram of the supplier self-evaluation process for responding to the buyer requirements in accordance with the present invention.

FIG. 5 is a flow diagram of an exemplary execution of the supplier self-evaluation system shown in FIGS. 3 and 4. As shown in FIG. 5, the process begins at step 120 by the loading of the word processing-based system 104. The word processing-based system 104 loads the first RFP/RFQ question or maturity requirement from the RFP/RFQ template file 102 in step 122 and displays the question. If there is a previously-stored vendor response file 106, the supplier self-evaluation system automatically loads the stored answer in step 124 and prompts the supplier whether the answer should be accepted or rejected. In response to the prompt, the supplier will either accept the loaded answer, or will edit the answer with the appropriate response.

Figure 6:
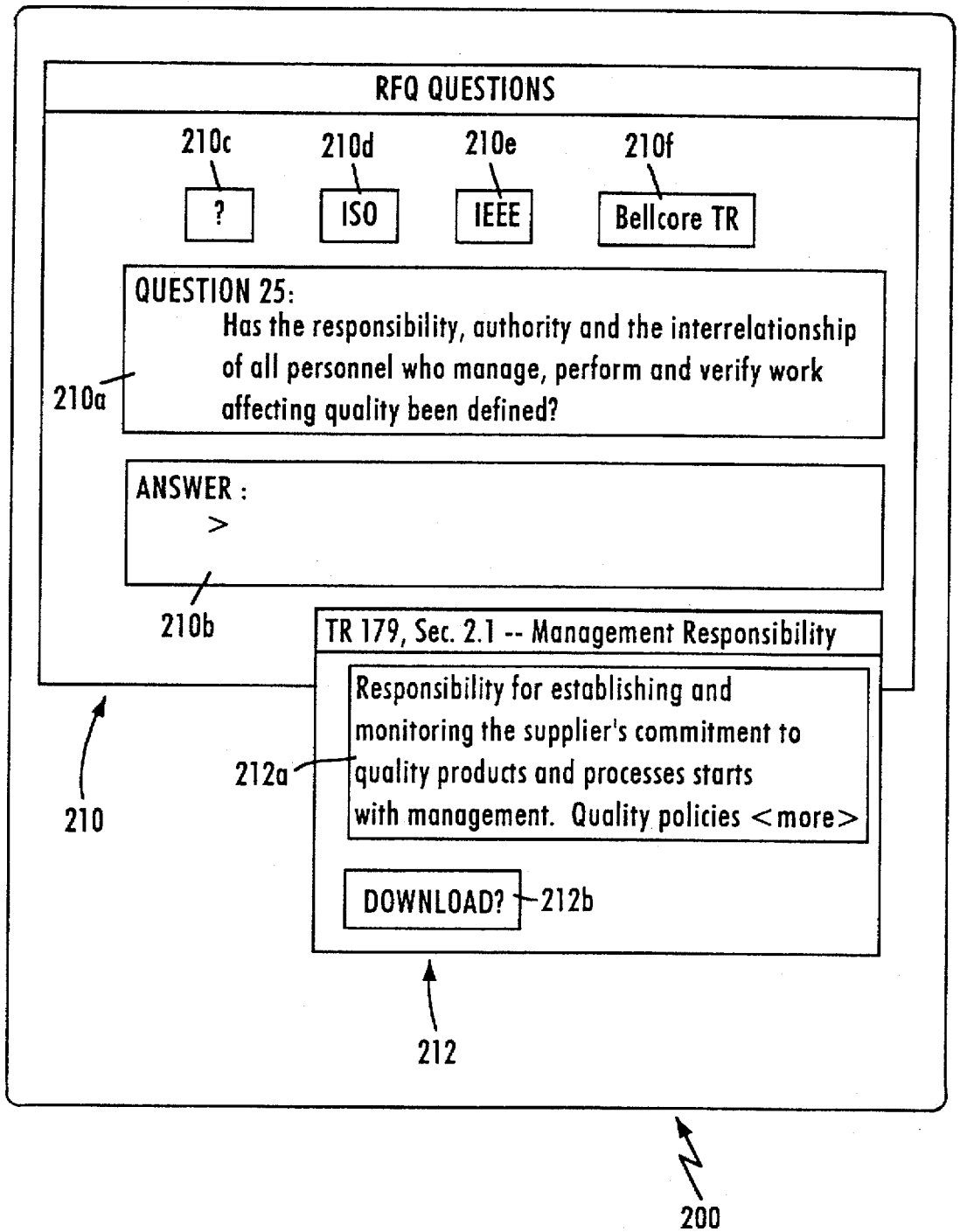
FIG. 6 is an illustration of a computer display showing execution of the supplier self-evaluation system of FIG. 3.

At any time, the supplier may request additional information by selecting one of the icons on the display in FIG. 6, such as a help button or an icon corresponding to a identified standard. If the supplier requests information at step 126, the access routine 104a accesses the requested information in step 128 from the local specification database 110 shown in FIG. 4. Upon displaying the requested information, the supplier is prompted at step 130 whether additional information should be downloaded. If the supplier desires to download additional information, the supplemental information corresponding to the information requested in step 128 is downloaded in step 132 from the remote specification database 62 using the communication software 112.

After the downloading of supplemental information from the remote database in step 132, the supplier is prompted at step 134 whether to continue the self-evaluation process. If the supplier desires to continue, the supplier is returned to the main display as shown in FIG. 6 in order to complete editing and to enter the answer in step 136. After entering the answer in step 136, the supplier is prompted in step 138 whether to continue to the next question. If the supplier desires to continue to the next question, the process returns to step 122. Alternatively, if the supplier decides to terminate the self-evaluation, the edited answers are saved in the vendor response file 106 at step 140 and the process is halted.

FIG. 6 discloses an exemplary display of the supplier self-evaluation system. As shown in FIG. 6, the display 200 shows a primary display window 210 and a secondary display window 212 superimposed over the primary display window 210. The windows 210 and 212 may use either a Microsoft Windows or Apple Macintosh format. The primary display window 210 comprises a question display portion 210a, an answer display portion 210b, a help icon 210c, and RFP/RFQ standards icons 210d–f. As shown in FIG. 6, the question display portion 210a displays the RFP/RFQ question loaded in step 122 of FIG. 5. The answer display portion 210b displays any loaded answer in step 124 that may be edited and finally entered in step 135 of FIG. 5. Once the edited answer displayed in 210b is entered, the answer is stored in the vendor response file 106 shown in FIG. 4. The help icon 210c is used to enable the user to select the help file 108 as shown in step 128 of FIG. 5. Similarly, the RFP/RFQ standard icons 210d, 210e and 210f are context-specific icons that identify a particular standard corresponding to the requirement currently displayed in the question display portion 210a. Upon selecting one of the RFP/RFQ standard icons, by the user, the access routine 104a accesses the relevant standard from the local specification database 110 and displays the requirement and/or standard on the display 200.

For example, upon selecting the RFP/RFQ standard icon 210f corresponding to a relevant Bellcore Technical Reference requirement, the supplier self-evaluation system accesses and displays the secondary display window 212 displaying the corresponding Bellcore Technical Reference requirement relevant to the question displayed in the question display portion 210a. As shown in FIG. 6, the secondary display portion 212 displays the text corresponding to the selected reference standard. If the supplier desires supplemental information, the user can select a download icon 212b, which causes the access routine 104a in FIG. 4 to instruct the communication software 112 to access the specification database 62 in order to retrieve supplemental information corresponding to the standard displayed in the text-portion 212a. After the information has been downloaded, the supplier will typically be prompted whether to store the downloaded data on a tangible storage medium, such as a hard disc, or whether to print the downloaded information. Alternatively, the downloaded information may also be automatically displayed on the display 200.

Thus, as shown in FIG. 6, a supplier is able to interactively perform a self-evaluation in order to respond to the RFP/RFQ. If the supplier needs additional information to adequately respond to the question, the supplier can first access the maturity requirements and standards stored in the local specification database 110. If the supplier requires additional information that supplements the information stored in the local specification database, the supplier may download supplementary information from the remote database. Thus, the present invention provides an efficient method for enabling a supplier to efficiently respond to requests for proposals in an efficient manner.

According to the present invention, the RFP/RFQ process for evaluation of a supplier as a potential vendor is enhanced from the perspective of the evaluator selecting different suppliers, and from the perspective of a supplier responding to the RFP/RFQ. The disclosed systems enable the supplier to more efficiently provide complete and accurate responses to an RFP/RFQ, and enable the evaluator to more efficiently obtain information necessary to select a vendor. Moreover, the disclosed system enables a more efficient procedure in performing the on-site supplier audit to verify the supplier's maturity level from a quality perspective level.

Although the disclosed embodiments relate primarily to an evaluation of maturity requirements from a quality perspective, it will be appreciated that the above arrangement may also be used in evaluating a supplier's capability to meet technical specifications for products and services.

In addition, although the supplier evaluation system is disclosed as having a main processing system and a plurality of databases, it will be appreciated that the disclosed embodiment may be modified by having a plurality of server systems, each having a specialized function. For example, the system of FIG. 2 may be modified to have a first server for processing specification access requests, a second server for processing vendor information requests corresponding to the vendor database 64, a third server for managing the product specifications corresponding to the product database 66, a fourth server enabling the business system 72 to generate the RFP/RFQ, and a fifth server interfacing with suppliers for handling downloading and uploading of information from the supplier site 74.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method for evaluating supplier capabilities to qualify a supplier as a vendor for a project, comprising the steps of:

selecting requirements necessary for vendor qualification for said project, each of said requirements having a relative weight assigned on the basis of project objectives;

providing said requirements to said supplier;

receiving supplier responses to said provided requirements, respectively;

assigning a scaled score for each of said supplier responses on the basis of corresponding desired vendor responses;

calculating in a computer-based processing system said supplier compliance level in accordance with said relative weight of a corresponding requirement and said scaled score of said corresponding supplier response;

conducting a supplier site evaluation based on a supplier compliance level and generating an on-site evaluation report in response thereto;

comparing said on-site evaluation report with said supplier compliance level to provide a combined supplier evaluation; and selecting said supplier as said vendor in accordance with said combined supplier evaluation.

2. A method as recited in claim 1, further comprising the step of incorporating said set of requirements into a vendor proposal request, said providing step comprising the step of supplying said vendor proposal request to said supplier.

3. A method as recited in claim 2, wherein said supplying step comprises the step of downloading said vendor proposal request to said supplier via a communication network.

4. A method as recited in claim 2, wherein said supplying step comprises the step of storing said vendor proposal request on a compact disc, and supplying said compact disc to said supplier.

5. A method as recited in claim 2, wherein said supplying step comprises the step of providing said supplier on-line access to a centralized evaluation system storing said requirements.

6. A method as recited in claim 5, wherein said on-line access providing step comprises the step of initiating an interactive evaluation session outputting project questions to said supplier in accordance with said requirements.

7. A method as recited in claim 5, wherein said on-line access providing step comprises the step of providing access to a standards database storing a plurality of quality standards corresponding to said requirements.

8. A method as recited in claim 1, wherein said receiving step comprises the steps of:

receiving via a communication network an electronic data file comprising said supplier responses; and storing said supplier responses in a database.

9. A method as recited in claim 1, wherein said selecting step comprises the steps of:

accessing a database having standardized requirements;

selecting said requirements from said standardized requirements stored in said database; and assigning each of said selected requirements said corresponding relative weight; and storing said selected requirements on a tangible medium.

10. A method as recited in claim 1, wherein said conducting step comprises the steps of:

accessing a database having standardized requirements;

selecting at least a portion of said requirements from said standardized requirements stored in said database;

preparing an on-site requirements list in accordance with said selected portion of said requirements and said supplier responses; and performing said supplier site evaluation in accordance with said on-site requirements list.

11. A method as recited in claim 10, wherein said conducting step further comprises the step of storing said on-site evaluation report on a tangible medium.

12. A method as recited in claim 11, wherein said storing step comprises the step of uploading said on-site evaluation report to a second database via a communication network.

13. A system for evaluating supplier capabilities to qualify a supplier as a vendor for a project, comprising:

a first database system storing a plurality of industry quality standards;

a second database system storing supplier information including existing vendor performance reports, historical vendor performance reports, supplier responses to project proposals, and audit reports generated during on-site evaluations of the supplier in accordance with selected quality maturity requirements;

processing means for generating said selected quality maturity requirements from said first database system, said processing means generating a first-tier supplier maturity level on the basis of said supplier responses to said corresponding quality maturity requirements each having a weight value, and a second-tier supplier maturity level on the basis of said audit reports performed in accordance with said supplier responses and said first-tier maturity level; and a terminal device for providing data access to said processing means.

14. A system as recited in claim 13, wherein said terminal device supplies said generated audit reports via a communications system for use by said processing means.

15. A system as recited in claim 13, wherein said processing means supplies said selected maturity requirements to said supplier via a communication network.

16. A system as recited in claim 13, wherein said processing means stores said selected maturity requirements on a compact disc, said compact disc being arranged to provide an interactive presentation of said selected maturity requirements.

17. A system as recited in claim 13, further comprising a product database storing historical performance data on products supplied by project vendors.

18. A system as recited in claim 13, wherein said processing means generates an audit schedule in accordance with said supplier responses, said on-site evaluation being executed in accordance with said audit schedule.

19. A system as recited in claim 13, wherein said processing means comprises a supplier interface enabling access to said first and second database system via a communication network, said supplier interface providing said selected quality maturity requirements to a supplier in response to an access request.

20. A system as recited in claim 19, wherein said supplier interface stores in said second database system said supplier responses to said corresponding quality maturity requirements received via said communication network.

21. A system as recited in claim 19, wherein said supplier interface provides a portion of said industry quality standards in response to a received database access request corresponding to at least one of said selected quality maturity requirements.

22. A supplier self-evaluation system for responding to a request for proposal, comprising:

a template file storing a plurality of supplier questions for said request for proposal;

a local database storing a plurality of maturity requirements corresponding to said request for proposal;

a control system for successively displaying one of said supplier questions from said template file and generating a supplier response file in response to user inputs, said control system comprising an access routine selectively accessing said maturity requirements corresponding to said displayed one supplier question in response to a first user access request, said access routine accessing, in response to a second user access request, a remote database to retrieve remote data supplemental to and complementary with said selectively accessed maturity requirements.

23. A system as recited in claim 22, wherein said template file, said local database and said control system are stored on a compact disc.

24. A system as recited in claim 22, wherein said access routine supplies said supplier response file to said remote database in response to a third user access request.

25. A system as recited in claim 22, further comprising a help file accessible by said access routine in response to a third user access request, said help file providing information corresponding to said displayed supplier question.

26. A method for responding to a request for proposal, comprising the computer-implemented steps of:

reading an electronic file comprising a plurality of questions related to said request for proposal, at least one of said plurality of questions corresponding to a selected set of quality maturity requirements;

successively displaying said plurality of questions during an interactive session;

selectively accessing a specification database in response to a supplier access request, to obtain information on the quality maturity requirements corresponding to a selected one of said displayed questions;

receiving a supplier response to at least one of said displayed questions, and storing said at least one supplier response in an electronic file to generate a supplier response file.

27. A method as recited in claim 26, wherein said storing step comprises the steps of:

establishing a connection with a remote database via a communication network; and storing said electronic supplier response file in said remote database.

28. A method as recited in claim 26, wherein said specification database is stored on a compact disc.

29. A method as recited in claim 26, wherein said selectively accessing step comprises the steps of:

accessing a first database to obtain first information corresponding to said selected one of said displayed questions;

accessing a second database via a communication network to obtain second information corresponding to said selected one of said displayed questions, said second information being complementary to said first information.

30. A method as recited in claim 29, wherein said selectively accessing step further comprises the step of storing said accessed second information.

31. A method as recited in claim 26, further comprising the step of uploading the supplier response file to a supplier evaluation system.

32. A computer-readable medium having stored thereon a plurality of sequences of instructions, said plurality of sequences of instructions including sequences of instructions which, when executed by a processor, cause said processor to perform the steps of:

receiving an electronic file comprising a plurality of questions related to a request for proposal, at least one of said plurality of questions corresponding to a selected set of quality maturity requirements;

successively displaying said plurality of questions during an interactive session;

selectively accessing a specification database in response to a supplier access request to obtain information on the quality maturity requirements corresponding to a selected one of said displayed questions;

receiving a supplier response to at least one of said displayed questions; and storing said supplier response in an electronic file to generate a supplier response file.

33. The computer-readable medium of claim 32, wherein the medium comprises a storage medium.

34. The computer-readable medium of claim 33, wherein the medium is a CD-ROM disc.

35. A computer-readable medium having stored thereon a plurality of sequences of instructions, said plurality of sequences of instructions including sequences of instructions which, when executed by a processor, cause said processor to perform the steps of:

receiving an electronic file comprising a plurality of questions related to a request for proposal, at least one of said plurality of questions corresponding to a selected set of quality maturity requirements;

successively displaying said plurality of questions during an interactive session;

selectively accessing a local database in response to a first supplier access request, to obtain information on the quality maturity requirements corresponding to a selected one of said displayed questions;

selectively accessing a remote database in response to a second supplier access request, to retrieve remote data supplemental to, and complementary with, said selectively accessed maturity requirements;

receiving a supplier response to at least one of said displayed questions; and storing said supplier response in an electronic file to generate a supplier response file.

36. The computer-readable medium of claim 35, wherein the medium comprises a storage medium.

37. The computer-readable medium of claim 36, wherein the medium is a CD-ROM disc.

38. The computer-readable medium of claim 35, including a sequence of instructions for causing the processor to upload the electronic supplier response file to a supplier evaluation system via a communications network.

* * * * *